CONTROL OF REMOTE TELEPHONE AND LIKE EQUIPMENT

Filed Feb. 21, 1962 11 Sheets-Sheet 1

Inventors
HENQUET CAVIN
& FEUILLEPAIN
By [signature]
Attorney

Inventors
HENQUET CAVIN
& FEUILLEPAIN
By [signature]
Attorney

Inventors
HENQUET CAVIN
& FEUILLEPAIN
By [signature]
Attorney

Aug. 31, 1965 A. J. HENQUET ETAL 3,204,041

CONTROL OF REMOTE TELEPHONE AND LIKE EQUIPMENT

Filed Feb. 21, 1962 11 Sheets-Sheet 4

Inventors
HENQUET CAVIN
& FEUILLEPAIN
By [signature]
Attorney

Aug. 31, 1965 A. J. HENQUET ETAL 3,204,041

CONTROL OF REMOTE TELEPHONE AND LIKE EQUIPMENT

Filed Feb. 21, 1962 11 Sheets-Sheet 5

Inventors
HENQUET CAVIN & FEUILLEPAIN
By [signature]
Attorney

Inventors
HENQUET CAVIN
& FEUILLEPAIN
By
Attorney

Aug. 31, 1965 A. J. HENQUET ETAL 3,204,041

CONTROL OF REMOTE TELEPHONE AND LIKE EQUIPMENT

Filed Feb. 21, 1962 11 Sheets-Sheet 7

Inventors
HENQUET CAVIN
& FEUIL LEPAIN
By
Warren [signature]
Attorney

CONTROL OF REMOTE TELEPHONE AND LIKE EQUIPMENT

Filed Feb. 21, 1962

Inventor
HENQUET CAVIN & FEUILLEPAIN
By [signature]
Attorney

Inventor
HENQUET CAVIN
& FEUILLEPAIN
By [signature]
Attorney

Inventor
HENQUET CAVIN
& FEUILLEPAIN
By [signature]
Attorney

Inventor
HENQUET CAVIN
& FEUILLEPAIN
By [signature]
Attorney

United States Patent Office 3,204,041

Patented Aug. 31, 1965

3,204,041

CONTROL OF REMOTE TELEPHONE AND LIKE EQUIPMENT

André Jean Henquet, Robert Victor Cavin, and Marcel Feuillepain, all of Boulogne-Billancourt, France, assignors to International Standard Electric Corporation, New York, N.Y., a corporation of Delaware Filed Feb. 21, 1962, Ser. No. 174,760
Claims priority, application France, Mar. 1, 1961, 854,302, Patent 1,294,150
11 Claims. (Cl. 179—18)

This invention relates to the control of remote equipments associated with telephone lines and particularly to controlling the release of trunks in remote offices.

An object of the invention is to provide new and improved concentrators for telephone systems. In this connection, an object is to provide new and improved line identification device for remotely controlling the operation of concentrators. Here an object is to utilize such identification to release connections in remote concentrators without allowing deterioration in communication. Quite the contrary, an object is to accomplish these ends without requiring attachments to the conversation line.

Another object of the invention is to provide new and improved line identifiers. In particular, it is an object to provide identifiers having general utility in communication switching systems. Thus, it is an object to provide devices for remotely accomplishing any desired switching function with respect to an identified line.

Yet another object is to provide line identifiers and line concentrators using readily available, low cost commercial components. Specifically, an object is to provide such identification and concention through use of devices which are compatible with existing telephone systems.

One such existing system is the "Pentaconta" crossbar system which is manufactured in France. While the invention is here described in connection with that particular system, it is not limited to use therewith.

A local telephone concentrator is generally linked to a distant concentrator via communication trunks, and via a transmission or service trunk. The transmission trunk gives local transmission equipment and remote transmission equipment a means for transmitting, in code, the identity of subscriber lines which are to be connected.

At one end of the transmission trunk, the identity is coded by means of an identification device. More particularly, a matrix having one inlet per line and one outlet per code element provides such code. At the other end of the transmission trunk, the identity is decoded by means of a selective switch having a sole inlet and one outlet per line.

The concentrator utilizes a crossbar switch of the so-called "Pentaconta" type. This type switch has a capacity of 52 lines, 13 selection bars with two sets of electromagnets, and a twicing bar with two electromagnets. A twicing bar is a bar on a crossbar switch that is operated simultaneously with a select bar in order to make a Z-coordinate (or an upper-lower) selection of crosspoint contact springs. Consequently the transmission device has a capacity of 52 code combinations and in fact comprises 4 elements which allow 6 combinations by two, four, of which are utilized for the selection each of a group of 13, and 6 elements which allow 15 combinations by two, 13 of which are utilized for the selection of one line among 13 lines. The selective switching element comprises a switch, having two outlets for the selection of the electromagnets of the twicing bar, and a switch having 26 outlets for the selection of the electromagnets of the selection bars. The setting of the selection bars in combination with the setting of a connection bar operates a particular crosspoint. The number of communication trunks may be, for instance, 8 or 12.

First, this crossbar transmission device is used to reach remote equipments in a concentrator system that are associated with trunks or lines and to control such equipments according to indications produced in an originating exchange. More generally, it is used to reach any control trunk equipments in a remote office. For example, it may be used in conjunction with toll ticketing devices.

According to a feature of the present invention, there is provided at the central exchange, an identify coding device having as many inlets as there are equipments to be identified. The coding device transmits by means of pulses in a sequence of moments or time frames. In the originating or local exchange, the device comprises a transmission trunk, a sending equipment controlled by the identity coding device, and a receiving equipment. In the remote or distant office, a device comprises a selector device adapted to reach the equipments to be controlled. The selector is set by the receiving equipment for applying a control marking to the designed equipment.

The invention relates more particularly to means for controlling the release of trunks in the remote office after a call is completed. In the past, three typical means have been used for controlling such release. One of these means required the connection of a trunk receiving device, such as a high impedance relay or a vacuum tube to a wire. While this means is widely used, it does not fulfill the desired condition that no attachments shall be connected to the conversation wires during the communication. Thus, communications deteriorate. Another means of controlling release required the transmission of special signals. For example, voice frequency signals superimposed on the communication wire commanded release at the termination of a call. This voice frequency signalling requires expensive equipments for separating voice and control signals and is justified only for long distance toll communications. A third means of controlling release required a service wire, i.e. three-wire trunks. This means is quite expensive, is rarely acceptable, and is used only for short trunks.

According to one feature of the invention, identity wires and devices for applying a marking to these wires are provided at the central exchange. These devices are associated with communication trunk equipments and operate in response to release signals produced by the central exchange. A coding device has the identity wires connected to its inlets. A transmission device connects between the switch outlets and a service trunk common to the group of communication trunks. At the remote office or station, a selector device is driven by signals sent over the service trunk from the coding device. The selector seizes a designated trunk equipment and applies a release marking to the designed trunk equipment at the termination of a call.

According to another feature of the invention, a concentrator system utilizes the coding transmission and selector devices. Here, the identity wires of the trunks are connected to additional inlets of existing identification device and are multipled on an additional outlet which controls the "release" code combination.

Other features and advantages of the invention will appear from the following description with reference to the accompanying drawings in which.

Figure 1:
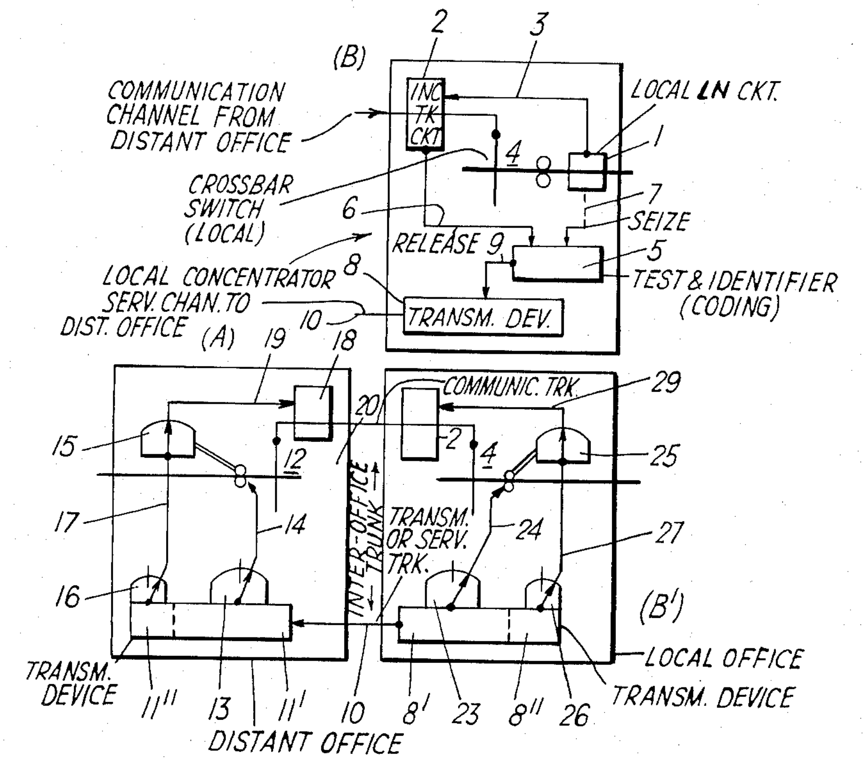
FIG. 1 is a functional diagram of an application of the invention to the release of trunks in a concentrator.

In FIG. 1, part B shows the local concentrator circuits at a time when a trunk release is indicated. The release signal is received by local trunk equipment 1 of the concerned line. This equipment 1 transmits a release signal through link 3 to equipment 2 of the engaged trunk. Equipment 2 releases the trunk or channel over local switch 4 and transmits the release signal through link 6 to a test and identity coding device 5. This device 5 receives the terminating calls which line equipments 1 extend thereto through links 7. The test is effected both on call signals extended over seize links 7 and release signals extended over release links 6. Release signals are given priority over the seize signals. The test and identifier device 5 identifies the trunk which is released in the local concentrator. This is of course, also the identity of the trunk which has to be released in a distant office concentrator. The identified trunk number is forwarded via a link 9 to a transmission device (which may be an outgoing trunk) 8. The device 8 transmits over trunk 10 the code of the trunk identity and also the code of the release order.

Parts A and B′ of FIG. 1 show circuits of the two concentrators. Here, the trunk in the distant office or remote concentrator A is released after circuit 8 transmits the trunk identifying code through the service chamber trunk 10. Normally, portion 11′ of the transmission device in the distant office receives, the code of a selection bar in switch 12. Now, however, device 11′ receives the code that identifies the trunk to be released. Responsive thereto, device 11′ reads the trunk identification code as if it were the code of a selection bar, and sets a selector circuit 13 which actuates the bar through link 14.

The actuated bar sets selector circuit 15 which is formed by contacts associated with the selection bars and which repeats selector 13. This arrangement is shown for convenience of description, but it should be understood selector 15 could be directly set by device 11′.

Normally, a device 11″ in the remote transmission device receives a code which identifies a group of lines and selects a twicing bar (not shown). The code also identifies a group of magnets (upper or lower) of the selection bars. Now, however, device 11″ receives a code which is a release order that sets selector 16 in a special position. This applies a control marking through link 17 to the input of a selector 15. Selector 15 applies this marking through link 19 to equipment 18 of the identified trunk. Equipment 18 thereupon releases the communication trunk 20.

In the embodiment of the invention described herein, an arrangement permits local equipment 2 to ascertain that distant equipment 18 has, in fact, released. For this purpose, equipment 18 applies an idle or free-condition marking to trunk 20. This marking is received by equipment 2 before the complete release of said equipment.

To this end, link and selector circuits 23–27 are provided in the local office concentrator B′. These circuits 23–27 are similar to the circuits and linke 13–17 of the remote concentrator A. Link 29 applies the marking provided in the special position of selector 26 to the trunk circuit 2 for operating a free-condition signal receiver when received from circuit 18. Upon reception of this signal, circuit 2 completely releases.

Figure 2:
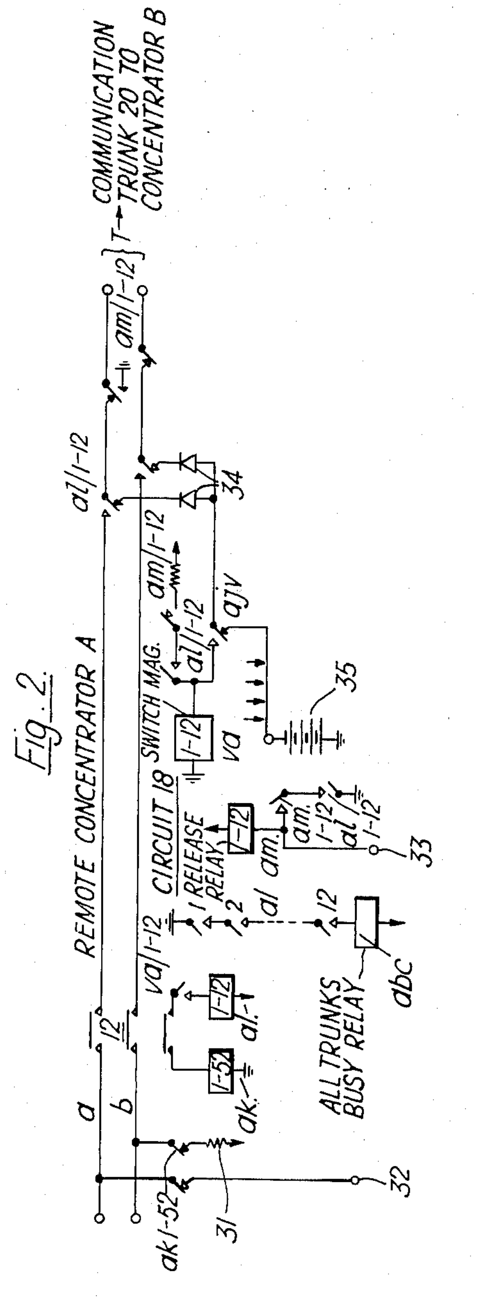
FIG. 2 represents the line and trunk equipments in the remote concentrator.

FIG. 2 shows the line equipment in the distant concentrator A. Here, a cut-off relay *ak*/1–52 is connected to a third wire of switch 12. (The designation, "1–52" indicates that there are 52 "*ak*" relays in the switch.) Preferably, the switch is of the Pentaconta type, carrying 4 groups of 13 lines by means of 13 selection bars and a twicing bar. Each bar is moved upwardly or downwardly, by one of its two associated magnets. Through rest contacts on relay *ak*/1–52, and resistor 31, a battery is connected to a wire *b*. Each wire *a* is connected to one inlet 32 of the test and identifying or coding device for the originating calls. This will be described hereinafter with reference to FIG. 3. When a calling subscriber station goes off-hook, the battery 31 is connected through that subscriber's loop to inlet 32.

Trunks are identified by the numeral 12. In each trunk equipment, a connecting relay *al*/1–12 can be connected to the third wire of the switch through a make contact of a relay V*a*/1–12 associated with a corresponding connecting magnet V*a*/1–12. (Again, the designation "1–12" indicates that there are twelve *al* relays.) The corresponding relays *al* and *ak* operate, therefore, in series when a connection is completed through the switch. As each *al* relay operates, it closes a contact in the operate circuit of an all trunks busy relay *abc*. When all twelve *al* relays have operated, a circuit is completed through a chain of contacts *al*/1–12 to operate relay *abc* which withholds new originating calls.

A release relay *am*/1–12 can be reached through an outlet 33 of a selector which will be described hereinafter with reference to FIG. 5. When an *am* relay operates through the outlet 33, it locks through contacts on relays *am* and *al* until a corresponding connecting relay *al* releases. Then, the locking circuit to relay *am* opens and relay *am* releases.

In the rest condition, the two wires T of the trunk are connected through contacts *am*/1–12 and *al*/1–12, diodes 34 and switch over contact *ajv* (in rest condition) to the battery 35 of the remote concentrator A for charging same. The *ajv* contact is controlled by a relay *ajv* (FIG. 5) which operates when the selection bar selection is set after the transmission of the trunk identity code.

When contacts *ajv* operate, magnet V*a* is connected to the two wires T of the trunk in order to be operated by a current supplied over the trunk T from the local concentrator. Magnet V*a* is locked through an operated contact, and a rest contact *am* of the release relay. When contacts on relay *al* operate, the trunk conductors T are extended toward the switch 12.

The local office concentrator is signalled that the trunk is being released. That is, when the switch release is controlled by a marking applied to outlet 33, relay *am* operates and is locked over *al* contacts. Relay *am* then releases the connecting bar of switch 12. At the same time, contacts on relay *am* open to disconnect the trunk line T from switch 12. At this time, relay *am* contacts close to apply a ground to wire *a* of trunk pair T. This ground informs the local concentartor B′ (FIG. 1) that the ordered release has been effected. When the connecting bar of switch 12 releases, it cuts off relays *al* and *ak*. Relay *al* unlocks relay *am*, which falls back and cuts off ground from wire *a* of the trunk line T. The trunk is now free.

Figure 3:
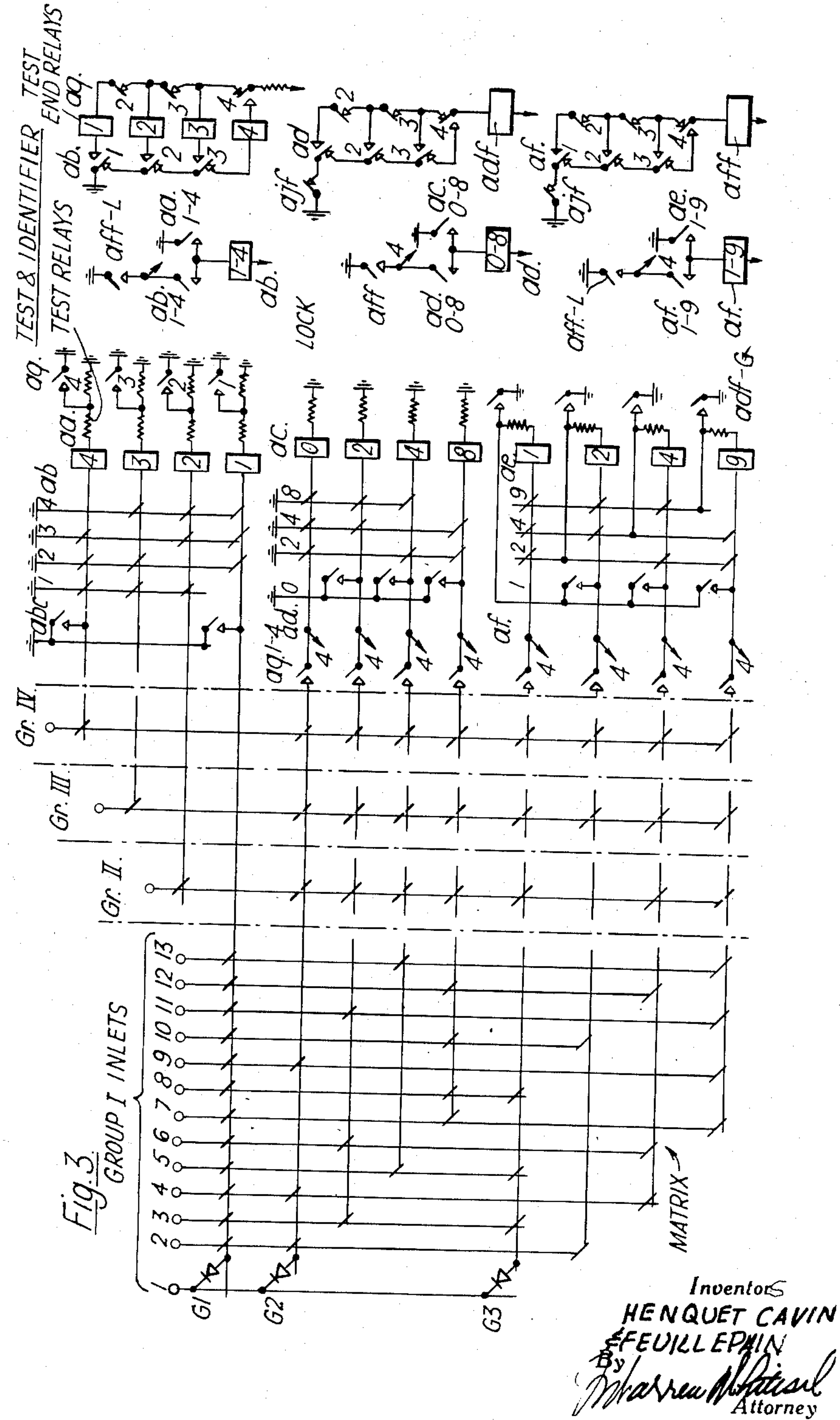
FIG. 3 represents the test and identity coding matrix in the remote concentrator.

The test and identifier or coding device of the trunk line T is shown in FIG. 3 as including switching matrix. The inlets of the matrix are multipled on three groups of outlets. In the first group G1, each group of 13 inlets is connected to an outlet which carries a test relay *aa*. 1–4. Lock-out relays *ab*. 1–4 and test end relays *aq*. 1–4 are associated with test relays *aa*. 1–4. (The numbers "1–4" indicate that there are four relays of each type.) The lock-out relays *ab* control contacts associated with the operate circuits of the test end relays *aq* in a manner such that the only one of the relays *ab*. 1–4 operates at any given time. The other two groups of outlets G2, G3, are divided into sections and each of the group of 13 inlets is connected to a separate section. After relay *aq*. *n* operates, it connects the section which carries the "*n*" group of 13 inlets to a terminal section comprising the test relays *ac*. 0, 2, 4, 8, or *ae*. 1, 2, 4, 9. Relays *ac*. 0–8 operate in cooperation with their lockout relays *ad*. 0–8. When the test is ended, a test end relay *adf* operates over a chain of contacts *ad*. 0–8. Again, only one *ad* relay is operated at any given time.

At contacts *adf*–G, relay *adf* puts an operating ground on the third group of outlets G3. In group G3, test relays *ae*. 1–9 operate in cooperation with their lock-out relays *af*. 1–9 and test end relay *aff*. At contacts *aff*–L, this relay puts an operating ground on locking circuits of lock-out relays *ab*, *ad*, *af*. Thereafter, the call marking may disappear without interrupting the operation. The circuits of test end relays *adf* and *aff* are controlled through rest contacts of an end-of-transmission relay *ajf* which operates when the code composed on the lock-out relays has been transferred onto the relays of the transmission device.

The transmission device (or outgoing trunk 8) will now be described with reference to FIG. 4. In the local concentrator B, this device comprises various seizing relays or circuits, a timer circuit, a sequence chain, a sender toward the remote concentrator A sequence chain, and a coding chain. In the remote concentrator A, a sequence chain is linked by trunk RA–RB, and a coding chain is linked by trunk MA–MB.

The seizing circuits, shown in the right hand portion of FIG. 4, will be described first. Seizing relay *cta* may be operated by a terminating call or an originating call. In the case of a terminating call, a test end relay *cff* operates in a device similar to that of FIG. 3 when the identity of the called line is coded, as will be described below with reference to FIG. 8. In the seizing circuits, relay *ctb* is operated through contacts *cff* and *ctd*. This relay closes it contacts *ctb*–1 and forms a loop through the two coding chains when the remote concentrator chain is in a rest condition. Relay *cta* operates. In case of an originating call, the test end relay *aff* of FIG. 3, forms another loop through the two coding chains. This time, however, the local chain is in rest condition when relay *cta* again operates. After operation, relay *cta* is locked through its auxiliary relay *cta'*; contacts *cta'*–1 operate a cascade of slow relays *cte*, *ctf* and *ctg*. The first slow operate relay *cte*, will be cut off at the end of the transmission by relay *cjf*, and this will determine the release of said cascade. The locking circuit of relay *cta* is first established by contacts *cjf'*–1 (relay *cjf'* being an auxiliary relay of *cjf*). Thereafter, it is held through contacts *ctg*–1 until complete release of the relay cascade.

At contacts *cta'*–1, relay *cta'* energizes an option circuit comprising relays *ctc* and *ctd*. On terminating a call, contacts *ctb*–2 are closed and the two relays *ctc*, *ctd* are operated, but relay *ctc* is locked to cut off relay *ctd* by the change-over contact *ctc*–1. On originating a call, relay *ctb* is in rest condition, thus only relay *ctd* is operated when contacts *cta'*–1 close. This cuts off *ctc* which will no longer be operated by a terminating call.

Then at contacts *cta'*–2, relay *cta'* energizes a timer circuit including relays *cka* to *cke*. In this circuit, relays *cka* and *ckb* (with its slave or auxiliary relay *cke*) act in conjunction with each other to generate pulses. Relays *ckc* and *ckd* divide the pulse rate by two. More particularly, relay *ckc* is operated during one operate cycle of relays *cka*–*ckb*, and release during the next following operate cycle of relays *cka*–*ckb*. Relay *cke* is operating in the middle of each operate cycle. The rate of the transmission is that of a complete cycle of relays *cka*–*ckb*. Relay *ckc* is operated during the odd moments of the transmission, and released during the even moments. At the end of transmission, relay *cjf* operates its contacts *cjf*–1 and holds relay *cka* operated. This stops the timer circuit without releasing it. At the test end time, the relay *ckc* is operated.

The sequence chains, of the remote concentrator, shown on the left of FIG. 4, will be described next. This chain comprises 10 moments relays *aj*. 1–10 and an end relay *ajf*. The odd relays, *ajf* included, are connected to a change-over contact chain 41, and the even relays to a change-over contact chain 42. Two oppositely poled diodes 43, route the alternate polarities of voltages on wire RA to these two chains of contacts 41, 42. Both chains of contacts connect through the winding of a seizing relay *ata* which will not release when the polarity of the voltage or conductor RA is reversed. Each relay in chain *aj* is connected to its associated chain of contacts 41, 42 by the make position of the change-over contact of the preceding relay. Since the preceding relay was operated on one polarity, the connected relay operates only after the RA supply voltage is reversed in polarity. The first relay, *aj*. 1, is directly connected at the end of chain 41.

The return of all relays to rest condition takes place through a common wire 44 connected to wire RB. The relays are locked on two change-over contact chains 45 and 46, so that each relay, when locking cuts off the second preceding relay. The locking chains are supplied through contact *ata*–1. Relay *ajf* has no locking circuit because it is held on the supply current emanating from conductor RA.

The circuit operates this way. In rest condition, the positive chain 42 reaches a battery at 47. Relay *aj*. 1 operates when the conductor RA supply becomes negative. The other relays successively operate when the supply changes in direction. Each relay which operates over one chain of contacts connects the following relay to the other chain of contacts and causes the 2nd preceding relay to release. That is, each relay releases the immediately preceding relay that was operated by the RA supply of the same polarity. At the end of the transmission, relay *ajf* operates and cuts off relay *aj*. 9. However, relay *aj*. 10 remains operated. When the supply is removed from conductor RA, relays *ata*, *ajf*, and *aj*. 10 release, thus restoring the chains 41, 42 to the rest condition.

The sequence trunk RA–RB in the local concentrator is supplied by a circiut 400 shown on the left of the timer circuit. In this circuit, change-over contacts *ckc*–1 of relay *ckc* alternately connect a positive battery and a negative battery to wires RA and RB, under the control of contacts *cta'*–3. During the first moment of transmission and the other odd moments, including the end-of-transmission time, relay *ckc* is operated to apply a battery potential in the following polarity: —RA+RB. During the even moments, relay *ckc* is released (when *cta'* is operated) and reverses polarity: +RA—RB. It will be understood that in the sequence chain of relays in remote concentrator A, odd pulses actuate the odd relays, and even pulses the even relays. Thus, the remote chain accurately advances under the control of the timer circuit. Between the time of operation of relay *cta'* and the first operation of relay *ckc*, there is a short positive pulse which reaches battery 47 through the change-over contact chain 42 in its rest condition. This permits seizing relay *ata* to operate shortly before receipt of the first negative pulse.

The sequence chain in the local concentrator B', is constructed like that in the remote concentrator. That is, relays *cj*. 1–10 and *cjf*, operate via change-over contact chains 51 and 52 and two locking change-over contact chains 53 and 54. There is no need for a return wire corresponding to wire 44 because the return is made to the central exchange battery. All the circuit is supplied through a make contact *cta*–3. A change-over contact *ckc*-3 alternately applies ground from contacts *cta*–3 to chains 51 and 52. This sequence chain therefore steps forward under the control of the timer circuit, in synchronism with the remote chain. End relay *cjf* is slow to release. Through *cjf*–1 it operates an auxiliary relay *cjf'*. Another auxiliary relay *cje* is operated through contacts *cj.* 9 and then held through contacts *cjf*–2.

As mentioned above, the operation of relay *cjf* releases the slow operating cascade of relays *cte, ctf, ctg,* and the release of relay *ctg* causes the release of relay *cta* and its slave relay *cta'*. At contacts *cta*–3, relay *cta* cuts off the circuit of the local sequence chain. At contacts *cta'*–3, relay *cta'* cuts off the supply of the remote sequence chain in remote concentrator A. In the remote chain, relays *ata, aj.* 10 and *ajf* fall back at once. In the local chain, relay *cjf* slowly falls back, followed by relays *cje* and *cjf'*. The release of *cta'* cuts off the supply of the timer circuit at contacts *cta'*–2 and relays *ckc* and *cka* release, followed by relays *ckb* and *cke*.

The code transmission chains, 401, 402, and remote chain 401 will be described next. This chain 401 comprises ten coding relays, that is, four relays *ag.* 1–4 for the code of the 4 groups of 13 and six relays *ah.* 0, 1, 2, 4, 8, 9 for the number code in the groups of 13. For practical reasons, assume that the transmission code is a little different from the identification code used in the test and identifier or notation relays (FIG. 3). Thus, the code of the 4 group comprises 4 combinations of two relays: *ag.* 1+3 for group I (*ab.* 1), *ag.* 2+3 for group II (*ab.* 2), *ag.* 1+4 for group III (*ab.* 3), *ag.* 2+4 for group IV (*ab.* 4). In addition, the combination *ag.* 3+4 is used for signalling a trunk release order. The number code comprises the same combinations of two relays as the notation code, except the combination "8" which is coded "*ah.* 8+0" for the transmission instead of "*ad.* 8+*af.* 1" for the notation. Relays *ah.* 2 and *ah.* 4 (FIG. 4) correspond to relays *ad.* 2 and *ad.* 4, *af.* 2 and *af.* 4 (FIG. 3) respectively.

The ten transmission relays in coding chain 401 are successively connected to two change over contact chains *aj.* 1–10 during successive moments or time frames of the transmission. Chain 61 reaches relays *ag*/1–4 through contact combinations of relays *ab.* 1–4 and relays *ah*/0–9 through contact combinations of relays *ad.* 0–8 and *af.* 1–9. This translates the notation code into the transmission code. The chain of contacts 61 is used for the originating calls, when the identity of the calling line is noted at the remote concentrator. Another chain 62 directly reaches these same relays and is used for the terminating calls when the identity of the called line is noted at the local concentrator. The chain 62 is also used for the release of trunks when the release signal and the identity of the trunk to be released are noted at the local concentrator. The ground return for relays *ag* and *ah* is through a common wire 63. The relays which have been operated are locked on a common wire 64, supplied by contacts *ata*–2 in operated condition. The two change over contact chains 61, 62 are separated by a rectifier bridge 65 so that a positive battery on conductor MA is routed onto chain 61 for the originating calls and comes back through conductor MB. A negative battery on conductor MB is routed over chain 62 for the terminating calls and comes back through conductor MA.

In the rest condition, chain 61 is cut off at contacts *aff*–1. It is looped over the return wire 63 when a noted originating call has caused the operation of relay *aff* (FIG. 3). This completion of the loop at contacts *aff*–1 constitute the signal of an originating call sent to the local concentrator. Contact *abc*–3 of the all trunks busy relay is set in series with contact *aff*–1 in the loop between chain 62 and conductor 63 to prevent the transmission of such a signal when all trunks are busy. On the contrary, chain 62 is directly looped to return wire 63 to provide a negative loop for the terminating call signal which the local concentrator transmits to itself through the loop to check the rest condition of the sequence relays *aj.* 1–10 and *ajf*. The timer circuit acting through the supply circuit 400, then transmits pulses of alternate polarity to the sequence chain of relays which follow each other by simple reversal. It also transmits pulses of one and the same polarity either positive pulses for an originating call or negative pulses for a terminating call, to the coding chain. The coding chain pulses on conductors MA, MB are spaced and centered within the sequence chain pulses on conductors RA, RB. When relay *aj.* 10 has been operated and two relays *ag.* 1–4 and two relays *ah.* 0–9 have been set so that the twicing bar and one selection bar have been operated either in one direction or in the other, a connecting preparation relay *ajv* operates through contacts *aj.* 10, one of the contacts HA/1–13 or H*a'*/1–13 and one of the contacts H*da* or H*da'*. As seen in FIG. 2, the relay *ajv* connects the magnets V*a*/1–12 to the wires T of the free trunks. When a release order is transmitted, as will be seen hereinafter, the twicing bar remains in rest condition and relay *ajv* does not operate.

Figure 4:
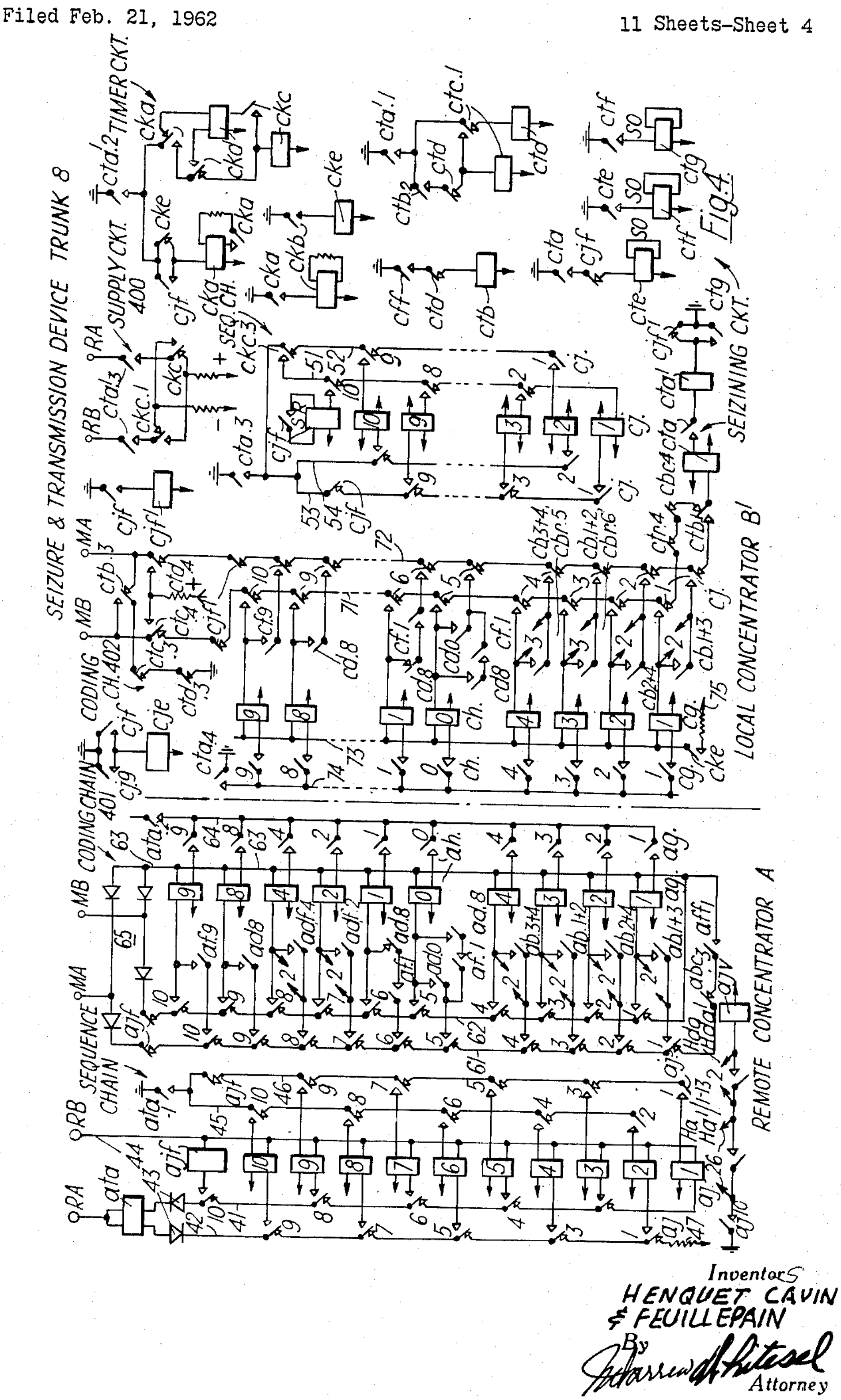
FIG. 4 represents the seizure and transmission circuits of the two concentrators.

In the local concentrator B', the code transmission chain 402 shown in FIG. 4 is constructed like the chain 401. In respect of the coding relays *cg.* 1–4 and *ch.* 0–9, their operating circuits are completed from two chains of change-over contacts *cj.* 1–10, 71 and 72, through the contacts of notation relays *cb.* 1–4, *cd.* 0–8 and *cf.* 1–9, the relay windings and their locking contacts *cg.* 1–4 and *ch.* 0–9 to ground on wire 74 supplied through *cta*–4. The return wire 73 leads to a negative battery 75 controlled by the centered timer relay *cke*.

The coding chain also comprises a call device and supply device. In the rest condition, a ground is applied to wire MA toward the distant concentrator through contacts *ctd*–3, *ctc*–3 and *ctb*–3. Wire MB is connected through contacts *ctc*–4, chain 71 and contacts *ctb*–1, to relay *cta*, which operates contacts when an originating call establishes the positive loop in the distant chain. On a terminating call, relay *ctb* operates and sets the same ground on wire MB. The return is through the negative loop in the distant chain, wire MA, contacts *ctd*–4, chain 72 and contacts *ctb*–1 to the seizing relay *cta*. On originating calls, a circuit and all trunks busy is completed through rest contacts *cbc*–4, an all trunks busy relay contact *ctr*–4 and winding of a release order relay. This release order relay operates when a release signal is noted, as will be seen hereinafter.

Responsive to the operation of one of the relays *ctc* or *ctd*, the above mentioned ground is removed from either conductor MA or MB at contact *ctc*–3 or *ctd*–3. A positive battery is then applied to conductors MA or MB over a circuit extending through contact *ctc*–4 or *ctd*–4. On originating calls, this battery potential is applied through contacts *ctd*–4, conductor MA, over a loop to the distant exchange and returns via wire MB, chain 71, and rest contacts of the coding relays to battery 75. On terminating calls, the circuit extends through contacts *ctc*–4, conductor MB, the loop to the distant exchange and return over conductors MA, resting contacts *ctd*–4 and chain 72 to the battery 75.

The release orders are coded by the combination "*cg.* 3+4." The circuits of these two coding relays are controlled through contacts *cbr*–5, *cbr*–6 in addition to call contacts *cb.* 1–4. The relay *cbr* will operate in the case of a release order, as will be seen hereinafter. The identity of trunks to be released is coded exactly like the identity of the called lines in a group of 13, but as the trunks are twelve, the combination "13" (*ch.* 4+9) is not used for the releases.

Figure 5:
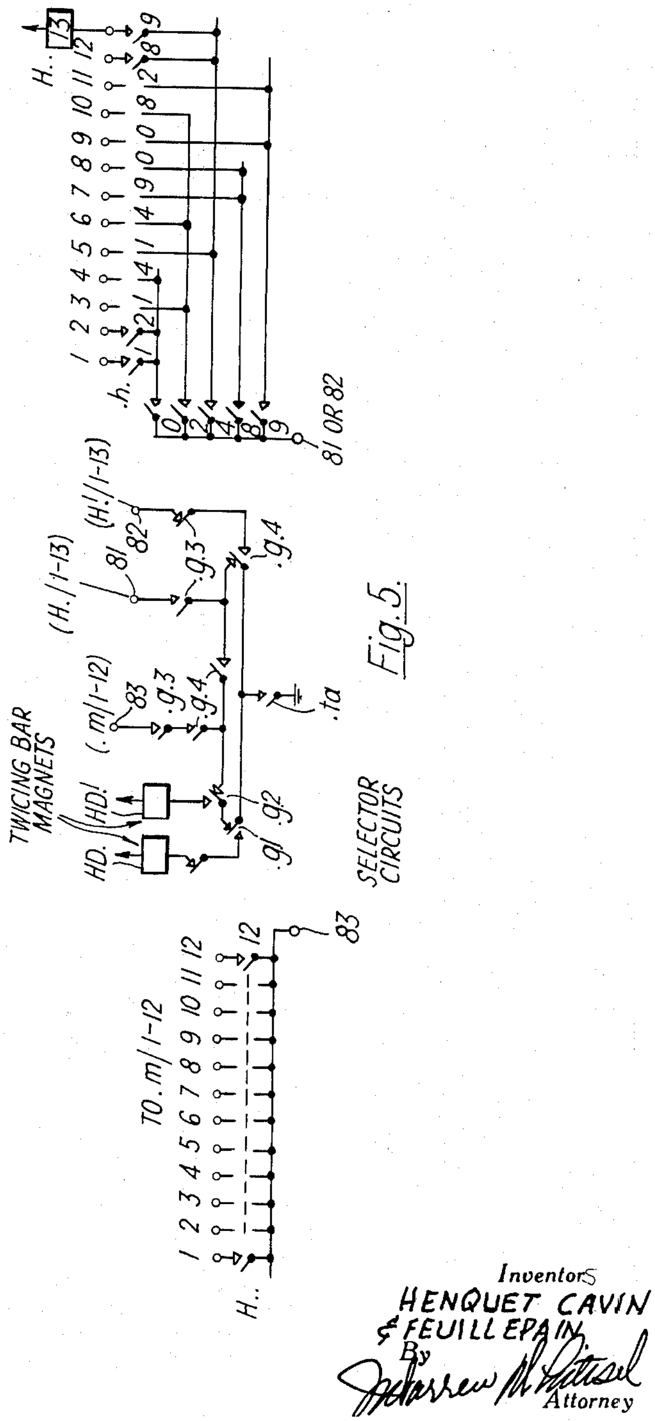
FIG. 5 represents the selector circuits utilized in the two concentrators.

FIG. 5 shows selector circuits which include the contacts of coding relays for reaching the selection bar magnets, and by the contacts of the selection bars for reaching the relay relays. These circuits are identical in the local and distant concentrators.

A first selector, shown in the middle of FIG. 5, is constituted by contacts of group relays *.g.* 1–4: combination +1 −2 actuates twicing magnet HD.; combination −1 +2 actuates twicing magnet HD.'; combination +3 −4 applies current to point 81 which is the selector inlet to one group of 13 selection magnets; and finally, for the release of trunks, the combination −1 −2 +3 +4 applies current, on one hand to the point 81, and on the other hand, to the point 83 which is the inlet of a release relay selector.

The two selection bar magnet selectors are constituted, as shown on the right of FIG. 5, by contacts of coding relays *.h.* 0–9. A first stage of contacts 0, 2, 4, 8, 9 routes the current on five multiples from where another stage of contacts 0–9 routes the current toward thirteen outlets 1–13 to which magnets H./1–13 or H.'/1–13 are connected. A magnet is therefore actuated as soon as two relays *.h.* 0–9 are set. For instance, the magnet is actuated during the 6th transmission moment for combination "1" or *.h.* 0+1, or during the 10th moment if the combination involves relay *.h.* 9. For a release order, a selection bar magnet H. is actuated by input 81 and the corresponding selector. The rank of the magnet H that is operated is that of the trunk to be released. But, neither of the two twicing bar magnets HD, HD' is actuated.

Figure 6:
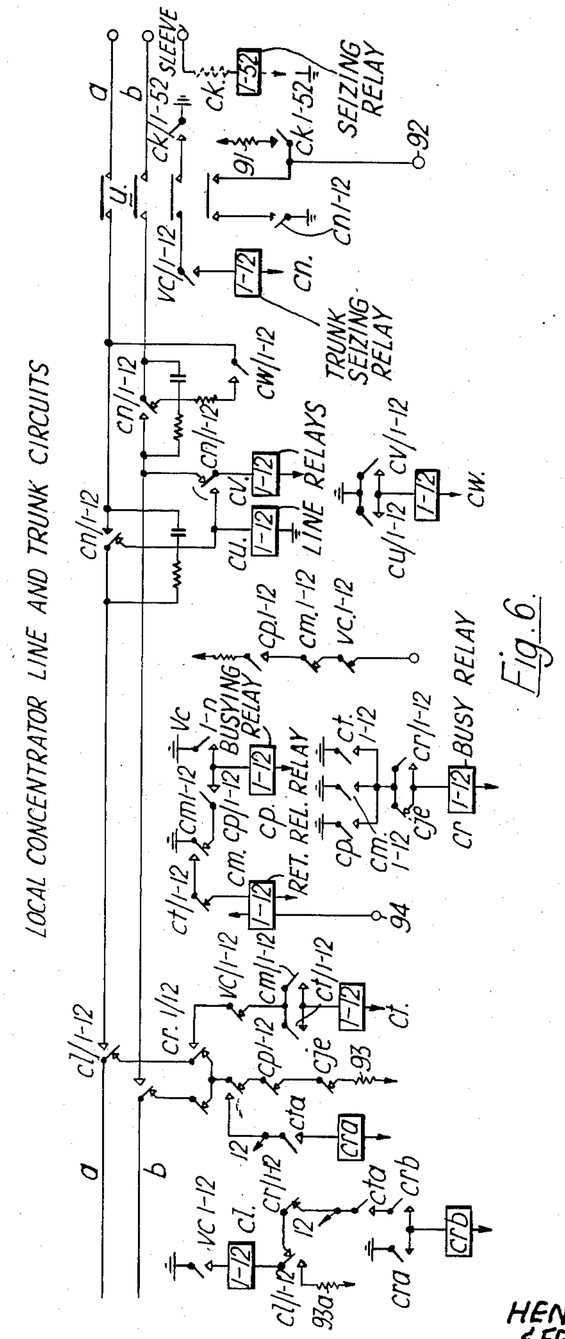
FIG. 6 represents the line and trunk equipments in the local concentrator.

The release relay selector is shown on the left of FIG. 5. Inlet 83 of this selector carries a multiple to which outlets 1–12 are connected through contacts associated with the respective magnets H./1–12. In the remote concentrator, release relays *am*/1–12 are connected to outlets 1–12 of the selector. In the local concentrator, release return relays *cm*/1–12 are connected to these outlets. The relays *cm* are shown in FIG. 6. Of course, this selector could be constituted by another set of contacts *.h.* 0–9, exactly like the selectors of selection bar magnets, when this would be more convenient. Moreover, the code need not be the same for numbers 1 to 12 of trunks to be released as for numbers 1 to 12 of the selection bars to be actuated for a call.

The equipment of lines and trunks in the local concentrator will be now described with reference to FIG. 6. The line equipment comprises a seizing relay *ck*/1–52 connected to a service wire or sleeve conductor in the line position. Relay *ck* is the first to be operated for a terminating call. Through contact *ck*/1–52 it connects a marking battery 91 to a corresponding inlet 92 of a test matrix, which will be described hereinafter. For an originating call, relay *ck* is operated last, when the calling line has been extended to the central exchange through the two concentrators. The release signal restores relays *ck*/1–12 but the release order is given to the transmission device only after the release of the connecting bar in the local switch 4, as it will be seen hereinafter.

The connecting equipment will now be described, as it functions during a terminating call. The marking of inlet 92 by a relay *ck*/1–12 is tested since the originating call is in the distant concentrator. The transmission device starts as described above. During the transmission, a free trunk is chosen and magnet Vc/1–12 (FIG. 7) of the corresponding connecting bar will be operated at the end of transmission. The magnets of the twicing bar and selection bar are operated at the latest at the 10th transmission moment, as mentioned above. The trunk seizing relay *cn*/1–12 then operates through contacts *ck*/1–52, the third wire of the switch U, and contacts Vc/1–12. Relay *cn* extends the trunk from the switch up to a second section and operates supply or line relays *cu*/1–12 and *cv*/1–12 in series. Relay *cw*/1–12, which can be operated by either of the line relays *cu* or *cv*, operates. On the other hand, connecting magnet Vc/1–12 operates a first busy relay *cp*/1–12 which locks itself onto the back contact of the return release relay *cm*/1–12.

Then, the magnet *vc* connects a common relay *cra* to the two wires of the third section of the trunk which extends toward the remote concentrator.

In rest condition, battery 93 is connected to the two trunk wires through contacts Vc/1–12, *cp*/1–12 and *cje* for loading the remote battery. Contact *cje* opens during the 9th transmission moment, as mentioned above, and disconnects battery 93 before the operation of the relay *ajv* in the remote concentrator (during the 10th moment) connects magnet V*a*/1–12 to the trunk, as mentioned above.

Relay *cra* operates in series with distant magnet V*a*/1–12. It operates a common relay *crb*, the locking circuit whereof is multipled on all relays *cl*/1–12 until relay *cta* releases. However, the operating circuit of relays *cl*/1–12 includes their back contacts, contacts of second busy relays *cr*/1–12. The ground is supplied by magnet contacts Vc/1–12, thus only the operating circuit of the concerned relay *cl* is completed in this manner.

The relay *cr* operates in series with relay *crb* when relay *cra* releases due to the disconnection of the remote magnet from the trunk wires. The relay *cl* which operates, locks itself on a passive battery 93*a* when it disconnects itself from relay *crb*. Then, when relay *cje* releases for the last time (after *cjf*) in a transmission cycle, the second busy relay *cr*/1–12 operates from ground on one of the contacts *cp*/1–12 and locks itself independently of relay *cje*. Operated relay *cl*/1–12 extends the trunk toward the remote concentrator.

It will be understood that for an originating call, relays *cra, crb* and *cl*/1–12 operate first. Then, relays *cu*/1–12 and *cv*/1–12 connected to wires *a–b* through contacts *cn*/1–12 operate on the loop of the calling subscriber. Next, relay *cw*/1–12 will repeat the loop toward the central exchange through contacts *cw*/1–12 and *cn*/1–12. Finally, the central exchange operates relays *ck*/1–52 and *cn*/1–12.

The release signal given by the central exchange releases relays *ck*/1–52 and *cn*/1–12. Relay *cn* of the seized trunk in rest condition, connects relays *cu* and *cv* (also of the seized trunk) to wires *a*, *b*. These relays fall back when the subscriber hands up if no false ground or battery is on these wires. Relay *cw* of the seized trunk then releases and cuts off the locking circuit of the magnet Vc of the seized trunk, as it will be seen in FIG. 7. The magnet releases relay *cl*. Meanwhile, the transmission of the release order starts by a marking of point 92 (FIG. 6).

When the transmission is effected (which may occur from the 6th moment thereof), release relay *am* in the seized trunk is operated in the remote equipment, as mentioned above. A corresponding relay *cm* is operated in the local concentrator through point 94 which is connected to the corresponding outlet of the release selector, FIG. 5. The relay *cm* unlocks relays *cp*, but at the same time it takes up the locking of relay *cr*. The receiving relay *ct* is then connected to wire *a* through contacts *cl, cr,* Vc and *cm*. With relay *am* operated in the distant equipment, a ground is applied to wire *a*, and relay *ct* operates. It cuts off relay *cm* but takes up again the locking of relay *cr*. Lastly, when relay *am* releases to signify release of the distant equipment, relays *ct* and *cr* fall back and free the local equipment.

The device for seizing trunks in a predetermined order to extend calls will now be described with reference FIG. 7. This device has two stages. A finding stage seizes the first free trunk after a predetermined trunk is seized. A stepping stage designates the trunks, one after the other, as originating trunks for the finding stage. The two stages are cyclic.

Figure 7:
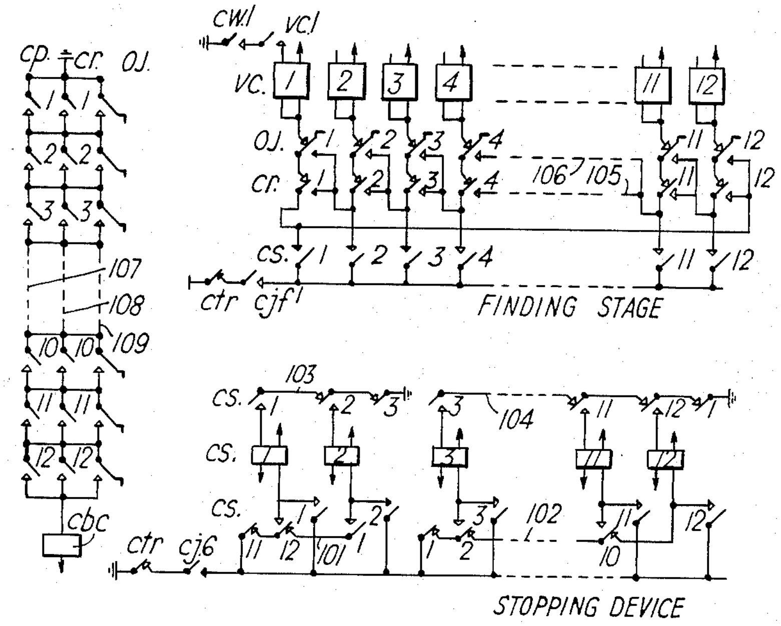
FIG. 7 represents the cyclic trunk seizure circuits in the local concentrator.

The stepping device which is a cyclic counter, is shown in the lower part of FIG. 7. It comprises a chain of relays *cs*/1–12 each of which has circuits for operating and locking on pulses. The second windings of the relays provide a standing locking circuit. For cyclic counting operations, the relays are separated into two half-groups, each with its upward change-over contact standing locking chain, respectively 101, 102, 103 and 104.

Assuming *n*, the number of relays (in the present case 12) and *k* an integer number including 0, the count $kn+p$ is shown by the standing locking or relay *cs/p*. When a pulse of the rank $kn+p+1$ arrives, it holds relay *cs/p* and operates relay $cs/p+1$. After this, pulse relay *cs/p* releases and relay $cs/p+1$ remains locked. For this reason, and in the two groups, the operating circuit of each *cs* relay comprises a front contact of the last preceding relay and a back contact of penultimate preceding relay. The standing locking circuit of each relay comprises a back contact of the next succeeding relay. A relay following the end of one half-group must not be at the same time, a preceding relay for the first one of the same half-group. Thus, the whole of the chain must include at least four relays.

For operation on the very first pulse, when all the chain is in rest condition, the circuit is such that the last relay operates first. This sets the chain in the preceding count condition *kn*, whereupon the first relay operates to remain operated alone after the first pulse. For this reason, the second operating chain 102 must include back contacts of all relays from the first up the antepenultimate. Hence, the first half-group is preferably limited to the two first relays. But the second operating chain 102 must not include the front contact of the penultimate because this contact would be inserted in the operating circuit of the last relay and would prevent it from operating on the first pulse after the rest condition of all the chain. Thus, relay *cs*/12 is directly connected to the back contact of relay *cs*/10 in the chain 102.

The stepping pulses are applied to the chain 102 through a front contact of moment relay *cj*. 6 which releases during the 8th moment. The pulses are controlled through contact *ctr* to prevent any chain step when the transmission device operates for releasing a trunk.

The finding stage shown in the upper part of FIG. 7 includes a set of inlet *cs*/1–12 controlled by the stepping device in a manner such that the finding process starts each time from a point one step further than the preceding time. The process inlets are connected in chain 105 to forwarding change-over contacts of relays *cr*/1–12. These change-over contacts are doubled by busy jack change-over contacts OJ/1–12 in chain 106. If the change-over contacts which correspond to the inlet for finding are in rest condition (i.e. if the trunk is free), the pulse operates connecting magnet V*c*/1–12 which locks under the control of contacts *cw*/1–12. If the trunk is busy, the change-over contact advances the pulse to the next trunk, and so on, in a closed cycle, until the pulse finds a free trunk. The pulse is applied at the end of the transmission through contacts *cff'* under the control of contacts *ctr*.

If all the trunks are busy, the all trunks busy relay *cbc*, which prevents the reception of the originating calls (FIG. 4), operates as soon as (the last) relay *cp*/1–12 operates. The test of terminating calls (FIG. 8) operates on a triple chain 107, 108, 109 (on the left of FIG. 7). Each link of these chains includes conacts *cp*/1–12, *cr*/1–12 and OJ/1–12 in parallel.

The test and coding device for the terminating calls and release signals will now be described with reference to FIG. 8. This device is similar to that of FIG. 3 in the distant concentrator. However, the first test stage comprises outlet G4 which is multipled on the group of 12 inlets which are connected to points 92 of FIG. 6. This outlet carries a test relay *car* associated with a lockout (and notation) relay *cbr* and an end relay *cqr*. This latter relay is included in the fifth link of an "only one operated" chain which comprises relays *cq*. 1–4. The group of release inlets is multipled at G5, G6 on the two other test stages exactly as each one of the four groups of calls inlets. The 13th position is not utilized because 12 trunks are provided.

Figure 8:
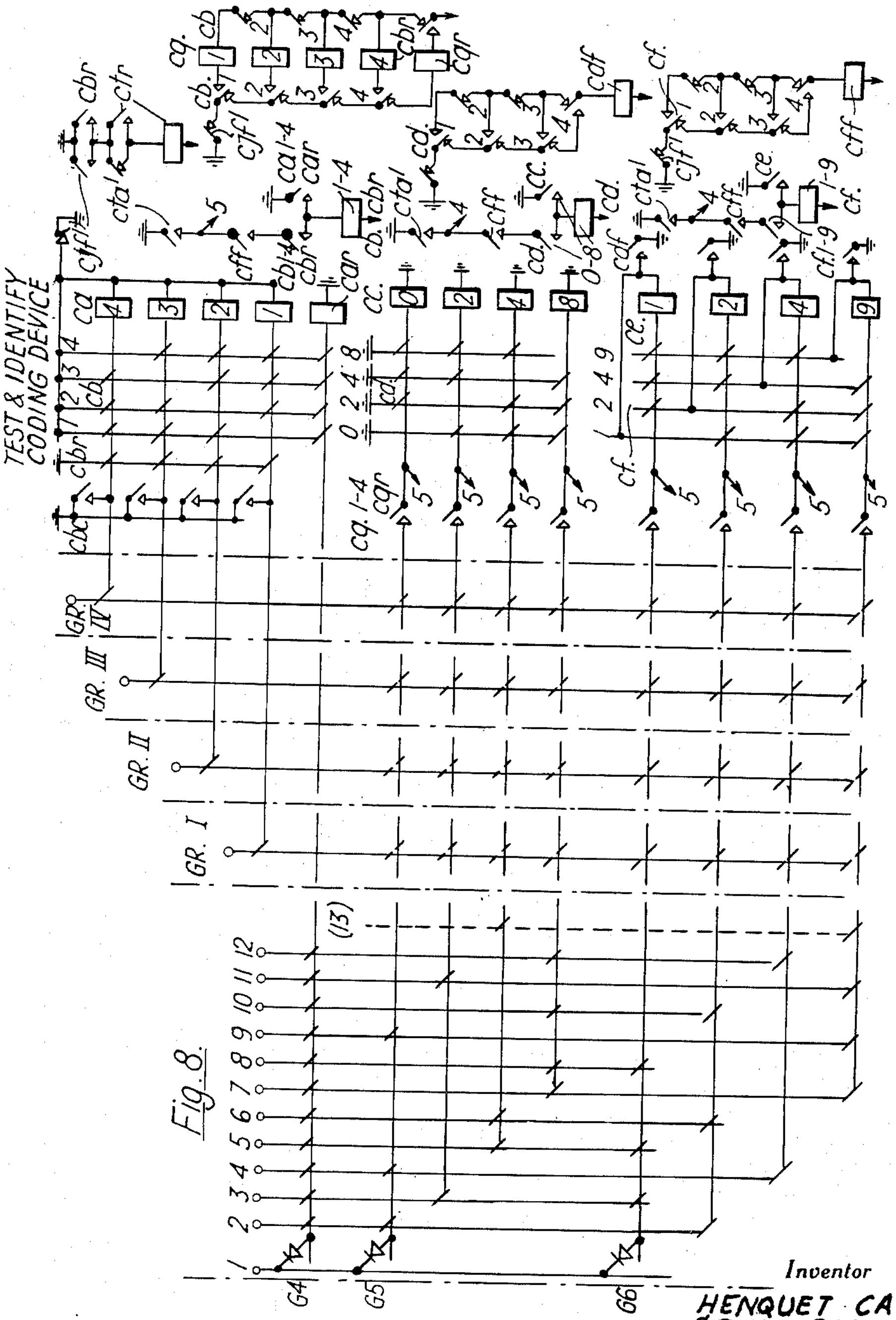
FIG. 8 represents the test and identity coding circuits in the local concentrator.

The reception of a release signal is marked for the time of its transmission by a relay *ctr* (in the upper right hand side of FIG. 8). Relay *ctr* operates through contacts *cbr*, *cta'* and locks itself via its contact that bypasses contact *cta'*. Contact *cjf'* bypasses contact *cbr* during the transmission end of the release, after relay *cbr* falls back. Lockout contacts of all trunks busy relay *cbc* lock the terminating calls out without locking out the release orders.

An embodiment of the invention (FIG. 9) for the release of the distant equipments of conventional trunks (equipments of incoming trunks in the distant exchange) will now be described. In this embodiment, it will be assumed that the transmission device is used for 20 trunks. The outgoing equipment (on the right) comprises a third wire *c* which is assumed to be cut off in rest condition. The exchange applies a ground to conductor *c* for busying the trunk, and a battery 111 as a release signal. This wire leads to a marking point 112.

In the incoming equipment (on the left), the wires of the trunk are cut off when the trunk is free. Cut off is via change-over contacts *en*/1–20 which extend a ground potential over wire *a* toward the local exchange and connect a seizing and release relay *em*/1–20 to wire *b*.

Figure 9:
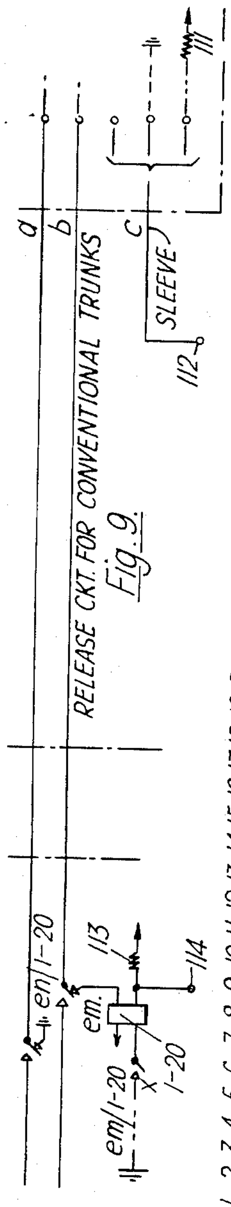
FIG. 9 represents an embodiment of the trunk equipment in an application of the invention for the release of incoming trunks in a remote central exchange.

When the local exchange in FIG. 9 engages a trunk, it operates relay *em* which locks itself on a circuit in the equipment and causes said change-over contacts to operate. The change-over contacts may belong to relays *em*/1–20 with an advanced locking contact *em*/1–20. Relays *em*/1–20 are connected to resistive batteries 113 with a release point 114 connected between the relay and resistance 113. When a releasing ground is applied to point 114, the relay falls back, unlocks itself and releases change-over contacts *em*/1–20 or *en*/1–20.

Figure 10:
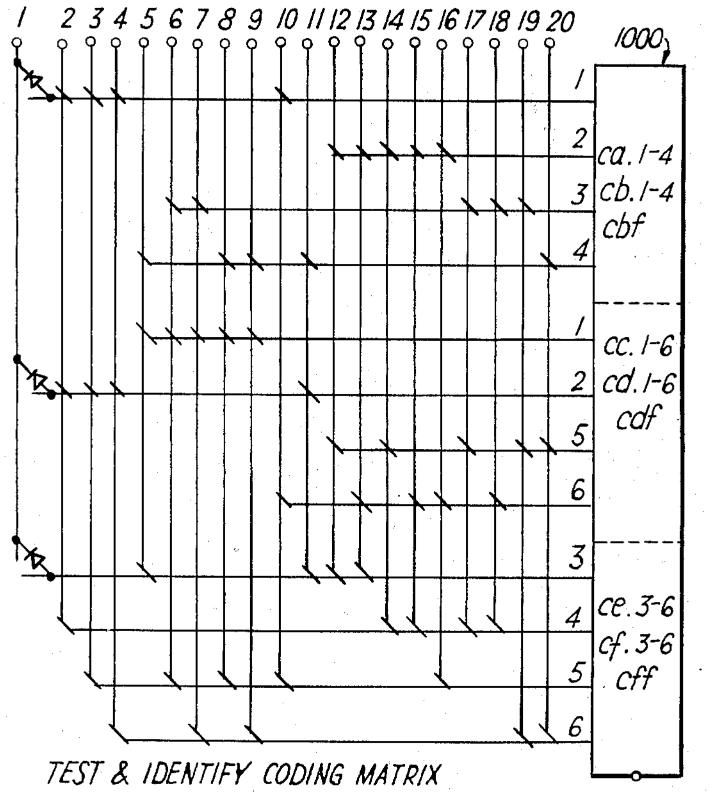
FIG. 10 represents a test and identity coding device for the above mentioned application.

The test and coding matrix of the release signals is shown in FIG. 10. It is a three-stage matrix with four outlets for each stage. The outlets are connected to test relays which cooperate with lockout relays and an end relay for each stage, as in one of the arrangements previously described. The code is a 6 moment code and for the transmission of the code, the 12 outlets of the matrix have only 6 different values, according to the arrangement shown in the drawing. For instance, trunk 14 is tested by relays *cb*. 2, *cd*. 5 and *cf*. 4 located in box 1000. The test result is transmitted in the code combination *cg*. 2+4+5. The transmission device may be similar to those previously described, with simplifications which will appear to those skilled in the art.

Figure 11:
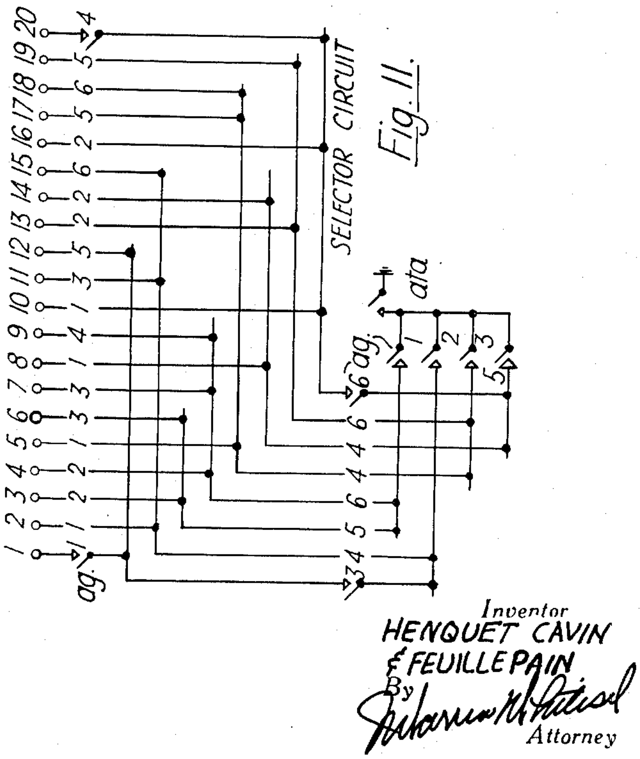
FIG. 11 represents a selector circuit for said application.

Upon reception of the transmitted code, the contacts of relays *ag*. 1–6 constitute a release selector in the manner which is shown. For instance, outlet 14 is reached by the first-stage contact *ag*. 5, the second stage contact *ag*. 4 and the third stage contact *ag*. 2 as shown in FIG. 11. As soon as three relays *ag*. 1–6 have been set in the code transmission, a marking ground is extended through contacts *ata* to the inlet and then the outlet of the selector. The corresponding release relay unlocks itself and releases the trunk. The central exchange then releases the transmission device.

Figure 12:
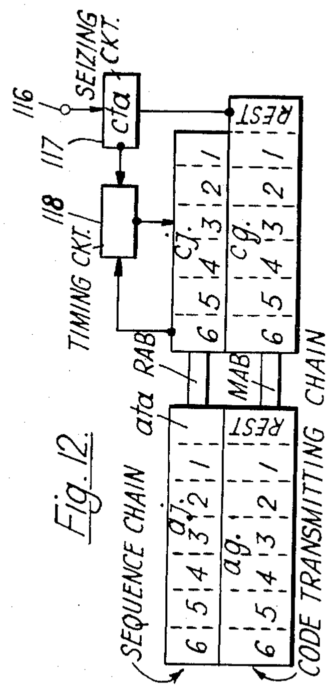
FIG. 12 is a functional diagram of the seizure and transmission circuits in the same application.

The transmission device is schematically represented in FIG. 12. The end notation relay (*cff*) applies a seizing marking at 116 to the seizing circuit 117 which ascertains the rest condition of the two transmitting chains. The seizing circuit starts the timer circuit 118 which steps the sequence chains *cj*. 1–6, *aj*. 1–6 while setting the relays *cg*. 1–6, *ag*. 1–6 in the code transmitting chains.

Figure 13:
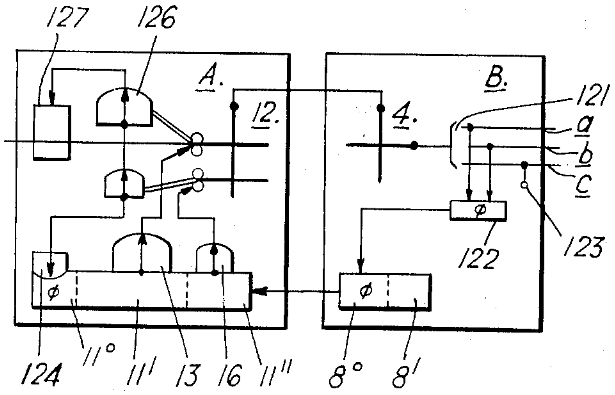
FIG. 13 is a functional diagram of an application of the invention to the control of line equipments in a remote concentrator from the central exchange.

An embodiment of the invention (FIG. 13) for the disconnection of the subscribers lines in a distant concentrator, will now be described. The transmission device comprises sections 8°, 11° (in addition to section 8', 8'', 11', 11'' as shown in FIG. 1), which transmit the code of either a connecting or disconnecting order.

As a rule, this section comprises two moments, with the code relay of the first moment set for the disconnection, and the code relay of the second moment set for re-establishing the connection of a line. It will be noted that for the release of trunks, the coding of trunks could be imparted to the sole sections 8', 11', and the sections 8", 11" could be utilized for the code of the release order. Here, in order to reach all the line equipments, sections 8", 11" have to be utilized to designate the groups of 13, exactly as in the transmission of calls. Thus, an additional section is necessary for transmitting orders concerning these equipment. If necessary, the seizing device may be such that this additional section can be bypassed when calls are transmitted, so as not to delay the transmission by two moments, which are then useless.

The line positions in the local concentrator may comprise control jacks 121 for three-wire plugs. Wires *a* and *b* my apply an order marking to seizing device 122 which transmits the orders to the transmission device for coding them in section 8° thereof. Wire *c* may apply a marking to point 123 connected to the test matrix of terminating calls (see FIG. 1). The preparation of a connection is suitably prevented by means similar to relay *ctr* which appears in the trunk release embodiment. The transmission device transmits the code of the required line, and through selective switching 13, 16 operates the corresponding selection and twicing magnets. Sections 8°, 11° set the code of the desired order in a backward selector 124. This selector applies an order marking to the input of selector 125 constituted by contacts of twicing magnets, and through the selector to one of the four selectors 126 constituted by contacts of selection magnets. The outlets of selectors 126 are connected to the line circuits wherein one of the markings causes the disconnection, or the other re-establishes the connection.

While the principles of the invention have been described above in connection with specific apparatus and applications, it is to be understood that this description is made only by way of example and not as a limitation on the scope of the invention.

We claim:

1. In a telephone system, the combination comprising local and remote equipments interconnected by at least one communication channel, means at each end of said channel for identifying lines connected thereto via said equipments, said identifying means comprising at least one matrix of vertical and horizontal conductors interconnected at pre-selected crosspoints in a manner such that input signals appearing at any matrix inlet also appear at a distinctively coded number of matrix outlets, means at least in part responsive to said identifying means comprising a service channel interconnecting said local and remote equipment for transmitting signals to said remote equipment, and means responsive to signals received over said service channel for operating said remote equipment.

2. The telephone system of claim 1 wherein said transmitting means comprises means operated responsive to said coding device, the output of said last named means being connected to said service channel.

3. The telephone system of claim 2 wherein said means for operating said remote equipment comprises a selector connecting the equipment to be operated, and means responsive to signals received over said service channel for operating said selector.

4. The telephone system of claim 3 wherein said local and remote equipments comprise telephone concentrators and means for operating said transmitting means responsive to the termination of calls through said concentrators.

5. The telephone system of claim 3 wherein there are a plurality of said channels, means comprising a rotating priority chain for designating successive ones of said channels, means for finding a particular one of said channels, and means responsive to said priority chain for starting said finding on said designated channel and for engaging the next free channel thereafter.

6. A telephone system comprising local and remote equipments including concentrators interconnected by a plurality of trunk lines, means in said local equipments for generating coded release signals which identify one of said trunk lines in said remote equipment, means comprising a selector in said remote equipment for seizing equipment having access to said trunk lines, said seized equipment comprising relays for releasing associated ones of said trunk lines, and means responsive to said coded release signals for operating said selector and said relays to release the identified trunk lines.

7. The telephone system of claim 6 wherein said code generating means comprises a device having as many inlets as there are trunk lines and as many outlets as there are code elements.

8. The telephone system of claim 7 wherein said transmitting means comprises means operated responsive to said coding means, the output of said transmitting means being connected to one of said trunk lines.

9. The telephone system of claim 8 and means comprising a rotating priority chain for designating successive ones of said trunk lines, means for finding a particular one of said trunk lines, and means responsive to said priority chain for starting said finding on said designated trunk line and for engaging the next free channel thereafter.

10. An identity coding device for a telephone exchange, means comprising an electromechanical switch having as many inlets as there are equipments to be identified and as many outlets as there are code elements, coding means for transmitting pulses during successive time frames responsive to signals emanating from the just named means, a trunk extending to remote equipment including a selector device, means for transmitting said pulses over said trunk to operate said selector device, and means responsive to operation of said selector device for controlling equipment identified by a marked one of said inlets.

11. The device of claim 10 wherein said switch comprises a crossbar switch and said inlets comprise identity wires connected to individual terminal points on said switch, and means in said exchange for selectively marking the identity wires and transmitting a code in accordance with said marking responsive to the termination of a call.

References Cited by the Examiner

UNITED STATES PATENTS

| | | | |
|---|---|---|---|
| 2,850,576 | 9/58 | Krom et al. | 179—18 |
| 2,850,577 | 9/58 | Krom et al. | 179—18 |
| 3,022,382 | 2/62 | Ewin | 179—18 |
| 3,070,666 | 12/62 | Brooks et al. | 179—18 |

ROBERT H. ROSE, *Primary Examiner.*

WILLIAM C. COOPER, *Examiner.*